United States Patent [19]

Bullard et al.

[11] 3,846,352
[45] Nov. 5, 1974

[54] PRESSURE SENSITIVE ADHESIVE COMPOSITIONS COMPRISING RUBBER AND A RESINOUS INTERPOLYMER

[75] Inventors: Herbert L. Bullard, Norton Village; David R. St. Cyr, Uniontown; Robert A. Osborn, Stow, all of Ohio

[73] Assignee: The Goodyear Tire & Rubber Company, Akron, Ohio

[22] Filed: Sept. 4, 1973

[21] Appl. No.: 394,006

Related U.S. Application Data

[62] Division of Ser. No. 219,497, Jan. 20, 1972, Pat. No. 3,784,530.

[52] U.S. Cl......... 260/5, 117/122 PA, 117/138.8 F, 260/28.5 B, 260/80.7, 260/82, 260/888, 260/889, 260/894, 260/896, 260/897
[51] Int. Cl............................ C08f 15/40, C08d 9/08
[58] Field of Search ............... 260/5, 80.7, 888, 894

[56] References Cited
UNITED STATES PATENTS

| | | | |
|---|---|---|---|
| 3,661,870 | 5/1972 | Bullard | 260/80.7 |
| 3,692,756 | 9/1972 | St. Cyr | 260/80.7 |
| 3,784,530 | 1/1974 | Osborn et al. | 260/80.7 |

*Primary Examiner*—James A. Seidleck
*Attorney, Agent, or Firm*—F. W. Brunner; H. C. Young, Jr.

[57] ABSTRACT

A resinous material characterized with a softening point in the range of about 60°C. to about 110°C. prepared by polymerizing piperylene, 2-methyl-2-butene, dicyclopentadiene and α-methyl styrene in the presence of a catalyst selected from aluminum chloride and ethyl aluminum dichloride and a solvent selected from aliphatic and aromatic hydrocarbons. The resinous material has particular utility as a tackifier for rubbery butadiene styrene copolymers.

2 Claims, No Drawings

PRESSURE SENSITIVE ADHESIVE COMPOSITIONS COMPRISING RUBBER AND A RESINOUS INTERPOLYMER

This application is a division of application Ser. No. 219,497, filed Jan. 20, 1972, and now U.S. Pat. No. 3,784,530.

This invention relates to new synthetic resins, to a method of preparation and to their admixture as tackifiers in polymeric materials.

It has previously been discovered that a mixture of piperylene and 2-methyl-2-butene can be copolymerized in the presence of a metal halide catalyst, such as aluminum chloride, to form new and valuable resinous materials that are different from the homopolymers of piperylene or 2-methyl-2-butene and which are very useful in a number of commercial applications. They are particularly useful as tackifiers for various rubbers.

However, such resins which are suitable as tackifiers for various rubbers such as natural rubber and rubbery polyisoprenes and polybutadienes are generally unsatisfactory as tackifiers for the rubbery butadiene-styrene and butadieneacrylonitrile copolymers so far as pressure sensitive adhesives are concerned where a very high degree of tack, shear and peel strengths are required.

Therefore, it is an object of this invention to provide a tackifying resin characterized by providing sufficient pressure sensitive tack for rubbery 1,3-butadiene-styrene adhesives.

In accordance with this invention, a resinous material is prepared by polymerizing a mixture comprising from about 15 to about 50 weight percent piperylene, from about 15 to about 50 weight percent 2-methyl-2-butene, from about 5 to about 40 weight percent dicyclopentadiene and from about 5 to about 40 weight percent α-methyl styrene, where the mole ratio of piperylene to 2-methyl-2-butene is in the range of about 0.8:1 to about 1.8:1, and more preferably about 1.2:1 to about 1.6:1. It is usually desired that the mixture to be polymerized comprises from about 20 to about 45 weight percent piperylene, from about 20 to about 45 weight percent 2-methyl-2-butene, from about 5 to about 25 weight percent dicyclopentadiene and from about 15 to about 30 weight percent α-methyl styrene.

The desired resinous materials prepared by the polymerization comprises from about 30 to about 55 weight percent units derived from piperylene, from about 20 to about 45 weight percent units derived from 2-methyl-2-butene, from about 15 to about 30 weight percent units derived from dicyclopentadiene and from about 20 to about 35 weight percent units derived from α-methyl styrene.

The resinous materials of this invention are characterized by having a softening point in the range of about 60°C. to about 100°C. according to ASTM Method E 28–58 T. They can typically have a softening point at about 70°C. to about 110°C. with vigorous steam stripping to remove low molecular weight materials including dimers, trimers and tetramers. The resins typically have good heat stability, a specific gravity at about 0.85 to about 1.0, an acid number at less than about 1.0 and a Gardner color in the range of about 4 to about 10.

The resins of this invention are particularly useful for the preparation of pressure sensitive and hot melt adhesives. Thus, in further accordance with this invention, a pressure sensitive adhesive has been discovered which comprises an admixture in a weight ratio of about 30:70 to about 70:30, preferably about 40:60 to about 60:40 of the resin of this invention with a rubber selected from natural rubber and from synthetic rubbers, containing about 60 to about 90 weight units derived from 1,3-butadiene, selected from butadiene-styrene copolymers and from butadiene acrylonitrile copolymers. The rubbery copolymers are generally prepared by emulsion polymerization and generally have a Mooney viscosity (ML–4) at about 100°C. in the range of about 45 to about 65.

A suitable hot melt adhesive according to this invention comprises an admixture of 100 parts by weight of a thermoplastic polymer selected from polyethylene, amorphorous polypropylene, ethylene-vinyl acetate copolymers, and ethyleneethylacrylate copolymers, preferably having a melt flow of about 5 to about 5,000 according to ASTM Method D 1238–57 T and a viscosity of about 100 to about 5,000 centipoises at about 177°C. and their mixtures with paraffin waxes with AMT melt points of 120°F.–155°F. and micro crystalline waxes with ASTM D–127 melt points of 160°F.–190°F., with from about 10 to about 70 parts by weight of the resin of this invention.

For the preparation of the resin of this invention, various anhydrous metallic halide catalysts can be used. Representative examples of such catalysts are aluminum chloride and ethyl aluminum dichloride. Anhydrous aluminum chloride is preferred.

In carrying out the polymerization reaction, the hydrocarbon mixture is brought into contact with the anhydrous halide catalyst. Generally, the solid catalyst is used in particulate form. Generally, a particle size in the range of from about 5 to about 200 mesh size is used although larger or smaller particles can be used. The amount of catalyst used is not critical although sufficient catalyst is used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and reaction conducted without a diluent being present. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction.

A wide range of temperatures can be used for the polymerization reaction. The polymerization can be carried out at temperatures in the range of from about −20°C. to about 50°C., although usually the reaction is carried out at a temperature in the range of from about 10°C. to about 35°C. The polymerization reaction pressure is not critical and may be atmospheric or above or below atmospheric pressure. Generally, a satisfactory polymerization can be conducted when the reaction is carried out at about autogeneous pressure developed by the reactor under the operating conditions used. The time of the reaction is not generally critical and reaction times can vary from a few seconds to 12 hours or more.

The polymers can be modified by the addition of up to about 25 weight percent of piperylene dimers or piperylene trimers or other unsaturated hydrocarbons particularly hydrocarbons containing from 4 to 6 carbon atoms, and mixtures thereof to the piperylene/2-methyl-2-butene/dicyclopentadiene/α-methyl styrene mixture. Representative examples of such hydrocarbons are butene and substituted butenes such as 2-methyl-1-butene, 2,3-di-methyl-1-butene, 2,3-dimethyl-2-butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene, 4-methyl-2-pentene; the hexenes such as 2-hexene; diolefins such as 1,3-butadiene and isoprene; and cyclic unsaturated hydrocarbons such as cyclopentene, cyclohexene and 1,3-cyclopentadiene.

Surprisingly, the structure of the resin of this invention is somewhat dependent on the solvent used in its preparation. For example, a monomer mixture comprising 23 weight percent piperylene, 21.5 weight percent 2-methyl-2-butene, 20 weight percent dicyclopentadiene and 20 weight percent α-methyl styrene polymerized with aluminum chloride in the presence of toluene produced a resin having a softening point of about 84°C.; in the presence of dichloromethane, produced a resin having a softening point of about 95°C.; and in the presence of heptane, producing a resin having a softening point of about 97°C. It, therefore, unexpectedly appears that polymerizations in the presence of aliphatic straight chain hydrocarbons having from four to eight carbon atoms, such as butane, pentane, heptane, and octane, including dichloromethane, produce resins having somewhat higher softening points than such polymerizations conducted in the presence of aromatic hydrocarbons, such as toluene, benzene, and xylene. Thus, although the resins of this invention are generally characterized by having softening points in the range of about 60°C. to about 100°C., it is a feature of this invention that such resins prepared with particulate anhydrous aluminum chloride in the presence of such aliphatic hydrocarbons, which herein include dichloromethane, have a softening point in the range of about 80°C. to about 100°C. and in the presence of such aromatic hydrocarbons have a softening point in the range of about 60°C. to about 90°C.

The resins of this invention can typically be further characterized by being generally soluble in aliphatic hydrocarbons such as pentane, hexane, and heptane and in aromatic hydrocarbons such as benzene and toluene. It is to be understood that these resins can have their composition modified, while maintaining their characterizations, by containing up to about 25 weight percent derived from the said piperylene dimers, piperylene trimers and other unsaturated hydrocarbons containing from 4 to 6 carbon atoms based on the total resin.

The resins of this invention are particularly useful as tackifiers for natural rubber and various synthetic rubbers. Representative of such synthetic rubbers are the butadiene-styrene copolymers, butadiene-acrylonitrile copolymers, and the stereo specific polymers of dienes such as butadiene and isoprene as well as ethylene-propylene copolymers and ethylenepropylene copolymers modified with a minor portion of a nonconjugated diene commonly known as EPDM. The utility of these resins is particularly enhanced when used for pressure sensitive adhesives by mixing with synthetic rubbers such as butadiene-styrene copolymers, especially since somewhat similar resins have been found to be unsatisfactory for this purpose.

The following examples further illustrate the invention and are not intended to be limiting. In these examples, parts and percentages are by weight unless otherwise indicated.

EXAMPLE I

Into a reactor were placed 100 parts of heptane and 3 parts of anhydrous aluminum chloride. While continuously stirring the mixture, 200 parts of a hydrocarbon mixture was slowly added to the reactor over a period of about 90 minutes. The hydrocarbon mixture had the following composition:

| Component | Percent |
| --- | --- |
| Piperylene (1,3-pentadiene) | 28.5 |
| 2-methyl-2-butene | 28.0 |
| Dicyclopentadiene | 20.0 |
| α-methyl styrene | 20.0 |
| Other unsaturated hydrocarbons having 4 to 6 carbon atoms | 3.5 |
| | 100.00 |

The temperature of the reaction was maintained in a range of about 25°C. to 30°C. After an hour of agitation from the time of final addition of the hydrocarbon mixture, approximately 5 parts water and 20 parts lime, hydrated calcium hydroxide, were added to neutralize and decompose the aluminum chloride. The mixture was filtered to remove particles of decomposed aluminum chloride and lime.

The filtrate was steam distilled to a pot temperature of about 235°C. The resulting residual molten resin was poured from the pot onto an aluminum tray and cooled to about 23°C. to form 144 parts of a hard brittle pale yellow resin having a Gardner color (50 percent in toluene) of 8.5 and a softening point (Ball and Ring), according to ASTM Method E 28–58 T of 96°C.

The distillate comprised 138 parts of a hydrocarbon mixture. An analysis of the hydrocarbon mixture was compared to that of the hydrocarbon mixture originally added to the reactor which indicated that the prepared resin comprised the following units:

| Component | Percent |
| --- | --- |
| Piperylene | 32.1 |
| 2-methyl-2-butene | 22.9 |
| Dicyclopentadiene | 22.2 |
| α-methyl styrene | 21.4 |
| Other unsaturated hydrocarbons containing 4 to 6 carbon atoms | 1.4 |
| | 100.00 |

EXAMPLE II

Into a reactor were placed 100 parts of toluene and 3 parts of anhydrous aluminum chloride. While continuously stirring the mixture, 200 parts of a hydrocarbon mixture were slowly added to the reactor over a period of about 90 minutes. The hydrocarbon mixture had the following composition:

| Component | Percent |
|---|---|
| Piperylene | 28.5 |
| 2-methyl-2-butene | 28.0 |
| Dicyclopentadiene | 20.0 |
| α-methyl styrene | 20.0 |
| Other unsaturated hydrocarbons containing 4 to 6 carbon atoms | 3.5 |
| | 100.00 |

The temperature of the reaction was maintained in a range of about 25°C. to 30°C. After an hour of agitation from the time of final addition of the hydrocarbon mixture, approximately 5 parts water and 20 parts lime, hydrated calcium hydroxide, were added to neutralize and decompose the aluminum chloride. The mixture was filtered to remove particles of decomposed aluminum chloride and lime.

The filtrate was steam distilled to a pot temperature of about 235°C. The resulting residiual molten resin was poured from the pot onto an aluminum tray and cooled to about 23°C. to form 153 parts of a hard brittle pale yellow resin having a Gardner color (50 percent in toluene) of 6.5 and a softening point (Ball and Ring), according to ASTM Method E 28–58 T of 82.5°C.

The distillate comprised 118 parts of a hydrocarbon mixture. An analysis of the hydrocarbon mixture was compared to that of the hydrocarbon mixture originally added to the reactor which indicated that the prepared resin comprised the following units:

| Component | Percent |
|---|---|
| Piperylene | 30.0 |
| 2-methyl-2-butene | 26.0 |
| Dicyclopentadiene | 19.5 |
| α-methyl styrene | 21.3 |
| Other unsaturated hydrocarbons containing 4 to 6 carbon atoms | 3.2 |
| | 100.0 |

EXAMPLE III

Into a reactor were placed 100 parts of dry dichloromethane and 3 parts of anhydrous aluminum chloride. While stirring the mixture, 200 parts of a hydrocarbon mixture were slowly added to the reactor over a period of about 90 minutes. The hydrocarbon mixture had the following composition:

| Component | Percent |
|---|---|
| Piperylene | 23.0 |
| 2-methyl-2-butene | 21.5 |
| Dicyclopentadiene | 20.0 |
| α-methyl styrene | 20.0 |
| Other unsaturated hydrocarbons containing 4 to 6 carbon atoms | 15.5 |
| | 100.00 |

The temperature of the reaction was maintained in a range of about 25°C. to about 30°C. The reaction mixture was allowed to continue reacting for an additional 90 minutes after the addition of the hydrocarbon mixture.

The reaction mixture was then neutralized by adding 5 parts water and 20 parts lime, hydrated calcium hydroxide, to the reactor.

The filtered resin solution was steam stripped in a stripping column. Approximately 125 parts of resin was produced. The resin had a softening point of 95°C. according to ASTM Method E 28–58 T and a Gardner color of 7.5.

EXAMPLE IV

A pressure sensitive adhesive was prepared by mixing 13.5 parts of a resin prepared in the presence of heptane according to the method of Example I, 13.5 parts of a rubbery butadiene-styrene copolymer having a butadiene to styrene weight ratio of about 77:23 and a Mooney viscosity (ML-4) at 100°C. of about 52, and 86.5 parts of toluene at about 25°C. After the rubber and resin dissolved in the toluene, a 1 mil coating was spread on a polyester (polyethylene terephthalate) film. The coating was dried and the coating film laminate cut into test strips. The adhesive properties of the coating were tested utilizing methods of the Pressure Sensitive Tape Council, PSTC-6 for tack, PSTC-7 for shear strength, (500 gm/½ in.$^2$), and PSTC-1 for peel. The following results were obtained:

| Tack: | 9 inches |
|---|---|
| Shear: | 42.5 hours |
| Peel: | 45 ounces |

The resin used in this example was prepared from a monomer mixture having the following composition.

| Component | Percent |
|---|---|
| Piperylene | 20.0 |
| 2-methyl-2-butene | 25.0 |
| Dicyclopentadiene | 19.0 |
| α-methyl styrene | 25.0 |
| Other unsaturated hydrocarbons containing 4 to 6 carbon atoms | 11.0 |
| | 100.00 |

EXAMPLE V

A pressure sensitive adhesive was prepared according to the method of Example IV except that the resin had been prepared in the presence of toluene. The following adhesive test results were obtained:

| Tack: | 1¾ inch |
|---|---|
| Shear: | 20.8 hours |
| Peel: | 45 ounces |

EXAMPLE VI

A pressure sensitive adhesive was prepared according to the method of Example IV except that natural rubber was used instead of the rubbery butadiene-styrene copolymer and that the resin was prepared from a monomer mixture having the following composition:

| Component | Percent |
|---|---|
| Piperylene | 18.3 |
| 2-methyl-2-butene | 22.5 |
| Dicyclopentadiene | 25.0 |
| α-methyl styrene | 25.0 |
| Other unsaturated hydrocarbons containing 4 to 6 carbon atoms | 9.2 |
| | 100.0 |

The following adhesive test results were obtained:

| | |
|---|---|
| Tack: | ½ inch |
| Shear: | 54 minutes |
| Peel: | 45 ounces |

EXAMPLE VII

A hot melt adhesive was prepared by mixing 15 parts of a resin prepared according to the method of Example I, 15 parts of a thermoplastic poly(ethylene/vinyl acetate) copolymer and 70 parts of paraffin wax at a temperature of about 90°C. This formulation was applied to corrugated cardboard as a hot melt adhesive coating and the laminate used for protective packaging of furniture.

The resin used in this example had a softening point of about 74°C. and was prepared from the following monomer mixture:

| Component | Grams* |
|---|---|
| Piperylene | 41.0 |
| 2-methyl-2-butene | 50.6 |
| Dicyclopentadiene | 28.0 |
| α-methyl styrene | 60.0 |

*produced about 137 grams of resin having a softening point of about 74°C.

While certain representative embodiments and details have been shown for the purpose of illustrating the invention, it will be apparent to those skilled in this art that various changes and modifications may be made therein without departing from the spirit or scope of the invention.

What is claimed is:

1. A composition which comprises a resinous material having a softening point in the range of about 60°C. to about 110°C. consisting essentially of piperylene, 2-methyl-2-butene, dicyclopentadiene and α-methyl styrene in an admixture with a polymeric material selected from natural rubber and synthetic rubber having a Mooney viscosity (ML–4) at about 100°C. of about 45 to about 65 where said resinous material comprises from about 30 to about 55 weight percent units derived from piperylene, from about 20 to about 45 weight percent units derived from 2-methyl-2-butene, from about 15 to about 30 weight percent units derived from dicyclopentadiene and from about 20 to about 35 weight percent units derived from α-methyl styrene prepared by the method which comprises polymerizing at a temperature in the range of about –20°C. to 50°C. in the presence of an anhydrous catalyst selected from aluminum chloride and ethyl aluminum dichloride and a solvent selected from aliphatic and aromatic hydrocarbons a mixture which comprises from about 15 to about 50 weight percent piperylene, from about 15 to about 50 weight percent 2-methyl-2-butene, from about 5 to about 40 weight percent dicyclopentadiene and from about 5 to about 40 weight percent α-methyl styrene, where the mole ratio of piperylene to 2-methyl-2-butene is in the range of about 0.8:1 to about 1.8:1.

2. A composition of claim 1 comprising an admixture in a weight ratio of about 30:70 to about 70:30 of said resinous material with a rubber selected from natural rubber and from synthetic rubbers selected from butadiene-styrene copolymers, said copolymers containing from about 60 to about 90 weight percent units derived from 1,3-butadiene.

* * * * *